(12) United States Patent
Yamanis (10) Patent No.: US 8,518,598 B1
(45) Date of Patent: Aug. 27, 2013

(54) SOLID OXIDE FUEL CELL POWER PLANT WITH A MOLTEN METAL ANODE

(75) Inventor: Jean Yamanis, South Glastonbury, CT (US)

(73) Assignee: UTC Power Corporation, South Windsor, CT (US)

( * ) Notice: Subject to any disclaimer, the term of this patent is extended or adjusted under 35 U.S.C. 154(b) by 22 days.

(21) Appl. No.: 13/455,191

(22) Filed: Apr. 25, 2012

(51) Int. Cl.
*H01M 4/38* (2006.01)

(52) U.S. Cl.
USPC ........... 429/485; 429/408; 429/428; 429/479; 429/482; 429/484; 429/523

(58) Field of Classification Search
USPC ......................................... 429/101, 102, 104
See application file for complete search history.

(56) References Cited

U.S. PATENT DOCUMENTS

| | | | |
|---|---|---|---|
| 7,745,064 B2 | 6/2010 | Blake et al. | |
| 7,943,270 B2 | 5/2011 | Blake et al. | |
| 7,943,271 B2 | 5/2011 | Tao et al. | |
| 2004/0202924 A1 | 10/2004 | Tao et al. | |
| 2006/0234098 A1* | 10/2006 | Gur | 429/30 |
| 2009/0166214 A1 | 7/2009 | Tao et al. | |
| 2010/0248065 A1 | 9/2010 | Yamanis et al. | |
| 2011/0311900 A1 | 12/2011 | Blake et al. | |

* cited by examiner

*Primary Examiner* — Ula C Ruddock
*Assistant Examiner* — Scott J Chmielecki
(74) *Attorney, Agent, or Firm* — Malcolm J. Chisholm, Jr.

(57) ABSTRACT

The plant (10) includes a molten metal anode (44) passing through a fuel cell (12) anode inlet (46) having a first interrupted flow generator (104), then into an anode flow field (42) of the fuel cell (12), and leaving the anode flow field (42) through an anode outlet (48) having a second interrupted flow generator (113). The molten anode (44) then flows into a reduction reactor (50) where the oxidized anode (44) is reduced by a reducing fuel (61). The molten anode (44) is then cycled back into the first interrupted flow generator (104) and anode flow field (42). Interrupting flow of the molten anode (44) prevents electrical continuity between the anode inlet (46) and the anode outlet (48) through the molten anode (44) within the anode flow field (42). This facilitates stacking the planar fuel cells in series within a fuel cell stack to build voltage.

22 Claims, 3 Drawing Sheets

SOLID OXIDE FUEL CELL POWER PLANT WITH A MOLTEN METAL ANODE

TECHNICAL FIELD

The present disclosure relates to solid oxide fuel cells and in particular relates to a solid oxide fuel cell having a molten metal anode passing through an anode flow field of the fuel cell.

BACKGROUND ART

Fuel cells are well known and are commonly used to produce electrical current from reducing fluid fuel and oxygen containing oxidant reactant streams, to power various types of electrical apparatus. Known solid oxide fuel cells generate both electricity and heat by electrochemically combining a fluid reducing fuel and an oxidant across an ion conducting electrolyte. In a typical oxide fuel cell, the electrolyte is an ion conductive ceramic membrane sandwiched between an oxygen electrode (cathode) and a fuel electrode (anode). Molecular oxygen, such as from the atmosphere, reacts with electrons at the cathode electrode to form oxygen ions, which are conducted through the ceramic membrane electrolyte to the anode electrode. The oxygen ions combine with a reducing fuel such as a mixture of hydrogen and carbon monoxide to form water and carbon dioxide while producing heat and releasing electrons to flow from the anode electrode through an electrical circuit to return to the cathode electrode.

Solid oxide fuel cells have many benefits and many limitations. For example, normal operating temperatures are very high, often in excess of 700° C., which favors stationary power plants operating in a near steady-state mode to minimize deleterious effects of thermal cycling as the fuel cell is started up and shut down. However, because of the high operating temperatures, it is known that solid oxide fuel cells may use a variety of reducing fuels and some of these fuels do not have to be reformed into pure hydrogen gas prior to entering the fuel cell. Additionally, solid oxide fuel cells are known to have long term operating stability and relatively low emissions of undesirable exhaust gases.

Recent developments in improving the efficiency of solid oxide fuel cells have included utilizing an oxidizable molten metal as an anode electrode. U.S. Pat. No. 7,943,271 that issued on May 17, 2011 to Tao et al. and assigned to CellTech Power, LLC shows an anode including a molten tin alloy that has resulted in significant potential benefits. These benefits include system simplification requiring no fuel reformer to produce a synthesized gas fuel ("syngas") including varying amounts of carbon monoxide and hydrogen. In use of the molten tin anode, the tin is oxidized to tin oxide by the oxygen ions passing through the cell electrolyte, which releases electrons. The tin oxide is then reduced by the reducing fuel back to tin.

While use of a molten tin anode has potential for efficient fuel usage, primary drawbacks include difficulties of managing a highly conductive, extremely hot molten metal within a fuel cell, and in particular within a stack of fuel cells that are generally layered upon each other to form a fuel cell stack. In order to build voltage in a fuel cell stack, groups of adjacent fuel cells are typically arranged electrically in series. A hot and highly conductive liquid anode electrode requires extremely complex control of movement of the molten metal anode to avoid short circuits between adjacent cells. To minimize such problems, it is known to utilize solid oxide fuel cells in a tubular, non-planar arrangement, wherein fuel cells of a fuel cell stack are wired together to build voltage, externally (i.e., by means of wiring that is external to the individual cells), and electrical connections are made at near room temperature, which is a complex and costly arrangement. Such a complex tubular arrangement in a fuel cell with a molten tin alloy anode is shown in U.S. Pat. No. 7,943,270 that also issued on May 17, 2011 to Blake et al. and that is also assigned to CellTech Power, LLC.

A further limitation of utilizing molten tin as an anode is that solid tin oxide ($SnO_2$) forms within the molten tin and tends to block a surface of the electrolyte thereby degrading cell performance. Tin oxide melts at 1,630° C., thus requiring the molten tin anode to be maintained at an extremely hot temperature.

Consequently, there is a need for a solid oxide fuel cell that overcomes the limitations of known solid oxide fuel cells.

SUMMARY

The disclosure includes a solid oxide fuel cell power plant wherein a molten metal anode passes through a first interrupted flow generator, then into an anode flow field of the fuel cell, and leaves the anode flow field through a second interrupted flow generator. The molten metal anode then flows into a reduction reactor where the oxidized molten metal is reduced by a reducing fuel. The molten metal anode is then cycled back into the first interrupted flow generator and anode flow field. Interrupting flow of the molten metal anode into and out of the anode flow field prevents electrical continuity through the molten metal within the anode flow field between an anode inlet and an anode outlet. This facilitates stacking the fuel cells in series within a fuel cell stack.

More specifically, the disclosure includes a solid oxide fuel cell power plant for generating an electrical current. The plant includes a solid oxide fuel cell having a cathode flow field configured to direct an oxidant stream from an oxidant inlet, through the cathode flow field and out of the cathode flow field through an oxidant exhaust line. A cathode electrode has opposed first and second planar surfaces and the first cathode electrode planar surface is secured to a porous cathode support which is secured adjacent the cathode flow field. An electrolyte also has opposed first and second planar surfaces and a first electrolyte planar surface is secured adjacent the second cathode electrode planar surface.

An anode flow field is configured to direct flow of a molten metal anode through the anode flow field from an anode inlet to flow adjacent the second electrolyte planar surface so that the molten metal anode is oxidized by oxygen ions passing through the electrolyte from the cathode electrode. The anode flow field is also configured to direct flow of the molten metal anode out of the anode flow field through an anode outlet.

The anode inlet includes the first interrupted flow generator, and the anode outlet includes the second interrupted flow generator. The interrupted flow generators disrupt electrical continuity through the molten metal anode within the anode flow field between the anode inlet and the anode outlet by interrupting a contiguous fluid stream passing from the anode inlet to the anode outlet. An exemplary interrupted flow generator causes the molten metal anode to flow into and out of the anode flow field in the form of droplets.

The power plant also includes a reduction reactor that is secured in fluid communication with the interrupted flow of molten metal anode flowing out of the anode outlet. A fuel inlet is secured in fluid communication between a source of reducing fuel and the reduction reactor for directing the reducing fuel into the reduction reactor. The reducing fuel reduces the oxidized molten metal anode. A pump is secured in fluid communication with a molten metal anode outlet of the reduction reactor and directs flow of the molten metal anode from the reduction reactor back into the anode inlet.

In a preferred embodiment, the molten metal anode is primarily the metal antimony. Applying molten antimony to the above structures shows three key reactions as the antimony, oxygen and a reducing fuel including carbon cycle through the fuel cell.

$$1.5O_2 + 6e^- \rightarrow 3O^{-2} \qquad \text{Reaction 1}$$

Reaction 1 takes place at the cathode electrode and is referred to as oxygen reduction.

$$2Sb + 3O^{-2} \rightarrow Sb_2O_3 + 6e^- \qquad \text{Reaction 2}$$

Reaction 2 takes place within the molten metal anode and is referred to as antimony oxidation. The six freed electrons flow from a current collector adjacent the anode flow field into an electrical circuit secured between the fuel cell and an electrical load.

$$Sb_2O_3 + 1.5C \rightarrow 2Sb + 1.5CO_2 \qquad \text{Reaction 3}$$

Reaction 3 takes place within the reduction reactor and is referred to as antimony oxide chemical reduction by carbon.

In one embodiment, the fuel cell is encased within an inert atmosphere box that is configured to prevent intrusion into the box of molecular oxygen that could oxidize the liquid anode instead of the desired oxidation of the molten metal anode by the oxygen ions passing through the electrolyte. The inert atmosphere box may include inert atmospheres such as argon, nitrogen, or a steam-carbon dioxide with minor concentrations of carbon monoxide and hydrogen mixture generated as a product gas by the reduction reactor and directed into the inert atmosphere box as the fuel cell power plant is operating. While the steam-carbon dioxide are the key reaction products, equilibrium will lead to formation of minor amounts of hydrogen and carbon monoxide which would also be beneficial for maintaining an inert atmosphere in the inert atmosphere box free of molecular oxygen. The inert atmosphere box includes the anode inlet and anode outlet so that droplets of the molten metal anode are never exposed to molecular oxygen from the atmosphere. Additionally, to prevent atmospheric molecular oxygen from entering the inert atmosphere box, the oxidant inlet and oxidant exhaust lines includes hermetically sealed segments within the inert atmosphere box to prevent the oxidant reactant within the oxidant inlet and exhaust lines leaving the inlet and exhaust to contact and oxidize the molten metal anode. With respect to a stack of adjacent solid oxide fuel cells, the hermetically sealed segments also include hermetically sealed inter-cell segments that extend between successive, repeat cell units to effectively contain the atmospheric air within the cathode flow field and cathode exhaust and air passageways or manifolds between adjacent cells in electrical isolation from the molten metal anode and from any conductive metal components of each cell and of adjacent cells. All of the hermetically sealed segments include dielectric materials to prevent electrical conductivity through the hermetically sealed segments, to thereby prevent short circuits.

In a further embodiment, the first and second interrupted flow generators may simply be in the form of troughs or pipes having a plurality of orifices configured to permit flow out of the orifices of only droplets instead of streams of the molten metal anode. It has been determined that for a fuel cell having a length across a shortest distance of a planar surface of the cathode electrode of about ten centimeter ("10 cm"), a number of necessary orifices would be about 2 or 3 orifices. Alternatively, and especially for a stack of adjacent fuel cells, the first interrupted flow generator may take the form of a single tube for each cell of the stack, wherein the tube is displaced above an entry of the anode flow field and is configured to permit a predetermined flow of droplets from a tube outlet into the anode flow field. Such droplet tubes may also be adjustable to change a droplet rate passing through the tube outlets to a variety of predetermined rates depending upon varying requirements of the fuel cell.

When the solid oxide fuel cell power plant includes a stack of a plurality of cells, the second interrupted flow generators of each cell in the stack, or of a group of cells within the stack, would preferably direct flow of droplets leaving the cells into a common collector that may utilize gravity in the form of a shallow funnel. The collector would direct flow of the molten metal anode leaving the fuel cell and inert atmosphere box into a line leading to the reduction reactor, wherein the line would prohibit intrusion of atmospheric molecular oxygen into the stream of liquid anode passing from the fuel cell to the reduction reactor.

In a further embodiment heat generated within the fuel cell during oxidation of the molten metal anode is transferred to the oxidant stream passing through the fuel cell. As the oxidant stream leaves the fuel cell within the oxidant exhaust line, the heated oxidant stream is directed into a heat exchanger that may be secured within or adjacent the reduction reactor to facilitate maintaining the liquid metal anode in a molten state and provide the heat or thermal energy needed by the reduction reactions. The heated oxidant stream may then leave the reduction reactor heat exchanger and then pass through an oxidant inlet heat exchanger to increase the heat of the oxidant stream entering the fuel cell.

Because the present solid oxide fuel cell power plant depends on droplet movement by the force of gravity, the fuel cell in some efficient embodiments would require that a vertical alignment axis of the fuel cell that permits droplet or interrupted free fall flow of the molten metal anode be about parallel to an axis of the direction of the force of gravity, in order to prevent the droplets in free fall from forming an uninterrupted, electrically conductive stream. However, the fuel cell would tolerate a change in the vertical alignment axis of the fuel cell so that the vertical alignment axis may vary by up to about twenty ("20°") degrees away from the force of gravity direction axis, depending Upon an actual cell stack and system design. The variability of the vertical alignment axis applies to the fuel cell having the molten metal anode droplets in free fall. If the droplets had a non-zero velocity from pumping, or any other motion characteristic, the fuel cell would tolerate different vertical alignments. The solid oxide fuel cell power plant is also configured for efficient shut down of the fuel cell by facilitating removal of the very hot, molten metal anode as rapidly and as efficiently as possible, into the reduction reactor. This avoids extreme stresses upon cell components of thermal cycling as the molten metal anode cools off. To achieve the efficient removal of the molten metal, the fuel cell is configured so that the an axis pass passing through centers of the anode inlet and anode outlet is about parallel to the direction of the force of gravity; the interrupted flow generators are oriented so the droplets move in a direction about parallel to the direction of the force of gravity; and, the reduction reactor is located below the fuel cell, wherein "below" is to mean with respect to the direction of the force of gravity.

While the molten metal anode may include any metals and mixtures thereof that are capable of serving as an anode in a solid oxide fuel cell such as described above, a preferred molten metal is antimony and mixtures thereof. Antimony may also be mixed with other metals such as lead, bismuth, tin. Preferably the molten metal anode includes metals having a low melting temperature, such as below about 750° C., and that are soluble into or miscible with antimony. The concentration of other low melting temperature metals, such as lead, bismuth, and tin, is limited to a maximum of 5 mole % if only one of the low melting temperature metals is added, and limited to a maximum of 10 mole % if more than one low melting temperature metal is added to the molten metal anode.

The fuel cell electrolyte may include a partially or fully stabilized zirconia, and yttria or a scandia-doped zirconia would be preferred components of the electrolyte. Alternative compositions for the electrolyte would be gadolinia-doped ceria, strontium-doped lanthanum gallate (LSG) and (strontium-doped) lanthanum (magnesium-doped) gallate (LSGM). The cathode electrode would preferably include mixtures of stabilized zirconia or doped ceria and strontium-doped lanthanum manganite (LSM) or (strontium-doped) lanthanum (cobalt-doped) ferrite (LSCF). The latter could be with or without additions of stabilized zirconia or doped ceria.

Therefore, it is a general object to provide a solid oxide fuel cell power plant with a molten metal anode that overcomes deficiencies of the prior art.

It is a more specific object to provide a solid oxide fuel cell power plant with a molten metal anode that enhances efficiencies of stacking a plurality of solid oxide fuel cells with molten metal anodes into a fuel cell stack, and that operates at a temperature less than about 1,000° C., and preferably at temperatures less than about 800° C.

These and other purposes and advantages of the present solid oxide fuel cell power plant with a molten metal anode will become more readily apparent when the following description is read in conjunction with the accompanying drawings.

DESCRIPTION OF THE PREFERRED EMBODIMENTS

Figure 1:
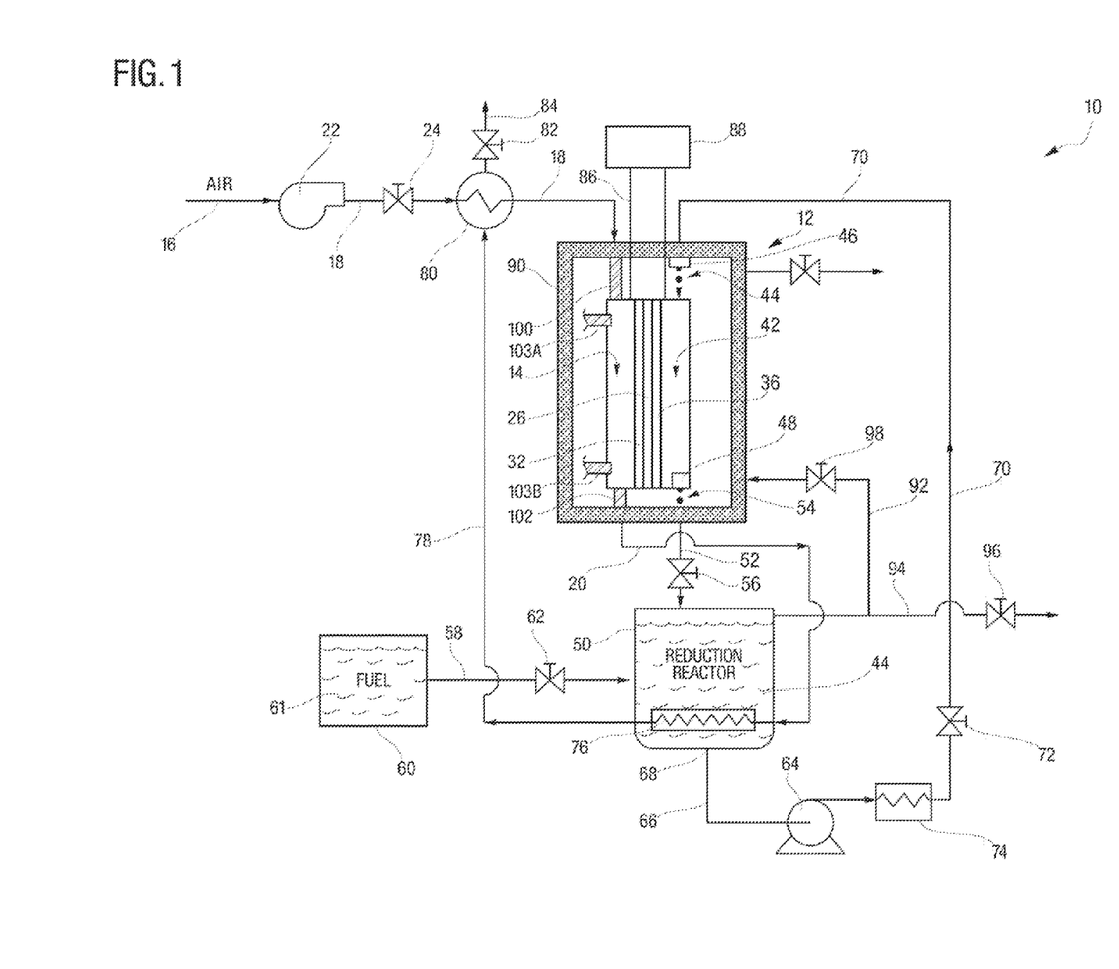
FIG. 1 is a simplified schematic drawing showing a solid oxide fuel cell power plant with a molten metal anode constructed in accordance with the present disclosure.

Referring to the drawings in detail, a solid oxide fuel cell power plant with a molten metal anode is shown schematically in FIG. 1 and is generally represented by reference numeral 10. The power plant 10 includes a solid oxide fuel cell 12 having a cathode flow field 14 configured to direct an oxidant stream 16 from an oxidant inlet 18, through the cathode flow field 14 and out of the cathode flow field 14 through an oxidant exhaust line 20. The power plant 10 may also include an oxidant blower 22 secured in fluid communication with the oxidant inlet 18 for selectively accelerating flow of the oxidant stream 16 through the oxidant inlet 18. The oxidant inlet 18 may also include an oxidant inlet valve 24 for selectively permitting and terminating flow of the oxidant stream into the oxidant inlet 18.

Figure 2:
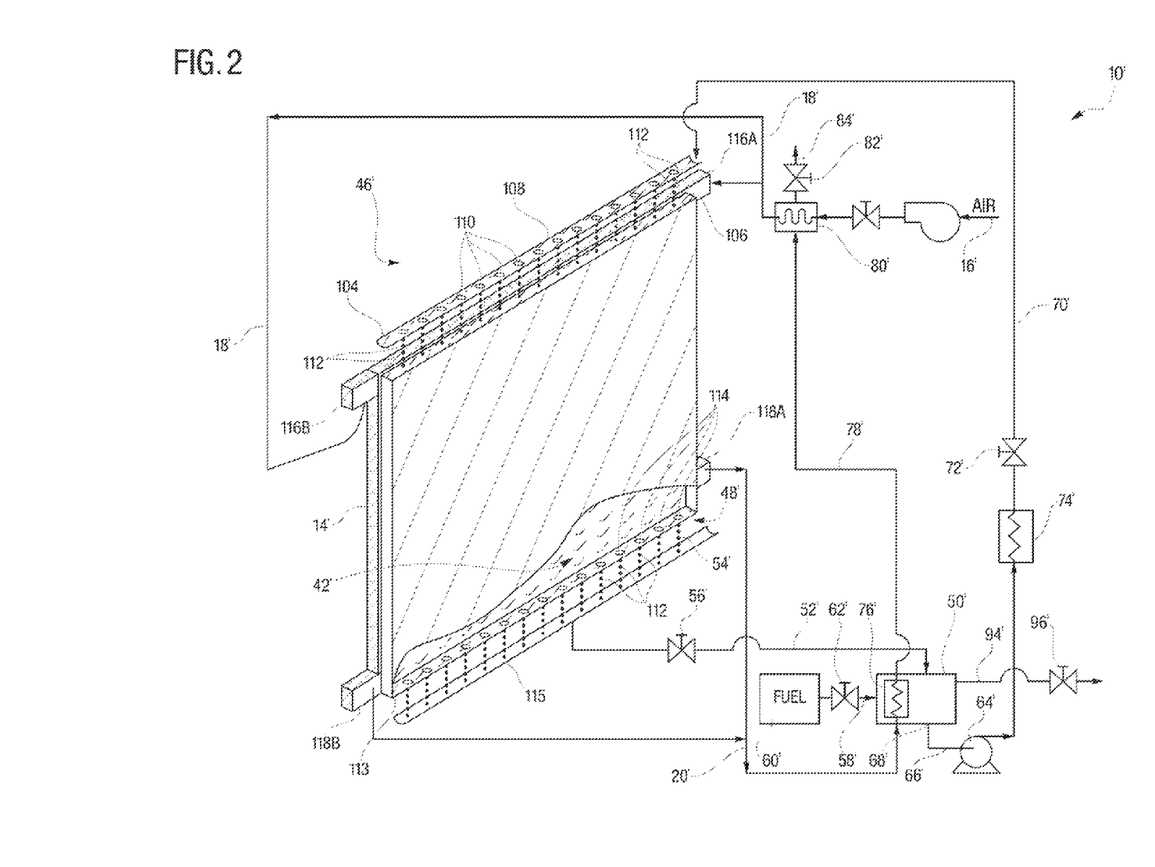
FIG. 2 is a simplified, fragmentary, schematic drawing showing a section of a solid oxide fuel cell power plant constructed in accordance with the present disclosure.
Figure 3:
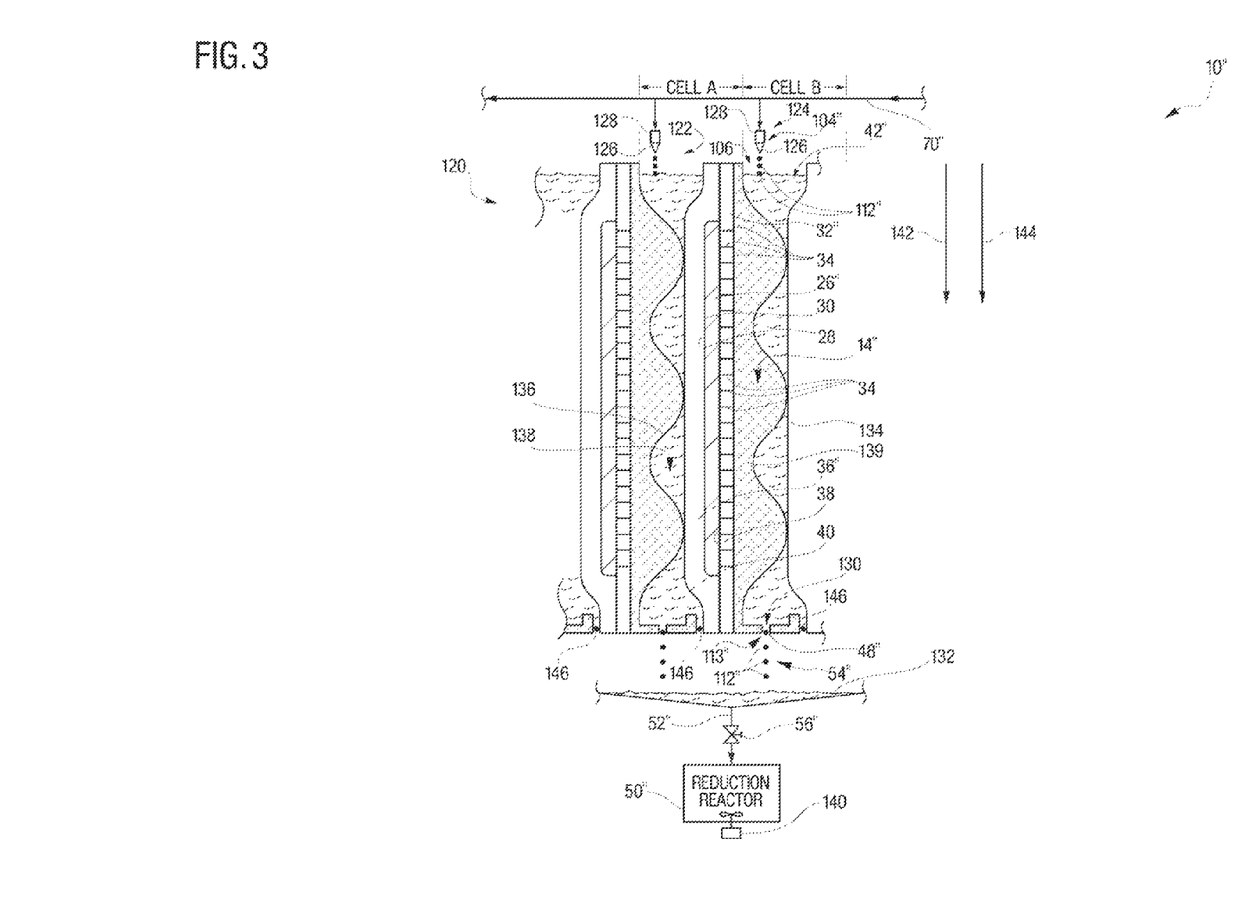
FIG. 3 is a simplified, fragmentary, cross-sectional, schematic representation of two solid oxide fuel cells secured adjacent each other within a fuel cell stack and constructed in accordance with the present disclosure.

A cathode electrode 26 is shown in FIG. 1. FIG. 3 shows a comparable cathode electrode 26" having a first cathode electrode planar surface 28 and an opposed second planar surface 30. (Components of the power plant 10 that are shown in FIGS. 2 and 3 that are comparable to components of the power plant shown in FIG. 1 will be characterized with respect to FIG. 2 as having primes (e.g., 10'), and with respect to FIG. 3 as having double primes (e.g., 10")). The first cathode electrode planar surface 28 is secured to a porous cathode support 32" which is secured adjacent the cathode flow field 14". The porous support 32" includes a plurality of pores 34 extending between the cathode flow field 14" and the cathode electrode 26".

An electrolyte 36, 36" also has a first planar surface 38 secured adjacent the second cathode electrode planar surface 30. The electrolyte 36, 36" also includes a second electrolyte planar surface 40 opposed to the first electrolyte planar surface 30.

An anode flow field 42 is defined adjacent the second planar surface 40 of the electrolyte 36, 36". The anode flow field 42, 42" is configured to direct flow of a molten metal anode 44 through the anode flow field 42, 42" from an anode inlet 46, 46' to flow adjacent the second electrolyte planar surface 40 so that the molten metal anode 44 is oxidized by oxygen ions (not shown) passing through the electrolyte 36, 36" from the cathode electrode 26, 26". The anode flow field 42, 42" is also configured to direct flow of the molten metal anode 44 out of the anode flow field 42, 42" through an anode outlet 48, 48".

The power plant 10, 10', 10" also includes a reduction reactor 50, 50', 50" that is secured in fluid communication through an anode exhaust line 52, 52', 52" with an interrupted flow 54, 54', 54" of molten metal anode flowing out of the anode outlet 48. The anode exhaust line 52, 52', 52" may also include an anode exhaust valve 56, 56', 56" for selectively permitting and terminating flow through the valve 56. A fuel inlet 58, 58' is secured in fluid communication between a source 60, of reducing fuel 61 and the reduction reactor 50, 50' through a fuel inlet valve 62, 62' secured to the fuel inlet 58, 58' for directing the reducing fuel 61 into the reduction reactor 50, 50', 50". The reducing fuel 61 reduces the oxidized molten metal anode within the reduction reactor 50. A pump 64, 64' is secured through a fuel exhaust line 66, 66' in fluid communication with a molten metal anode outlet 68, 68' of the reduction reactor 50, 50'. The pump 64, 64' selectively pumps flow of the molten metal anode 44 from the reduction reactor 50 through the fuel exhaust line 66, 66' into an anode inlet line 70, 70', 70" that is secured in fluid communication from the pump 64 to the anode inlet 46. The anode inlet line 70 may also include an anode inlet valve 72, 72' and an anode inlet heat exchanger 74, 74' for selectively heating the liquid anode 44. The heat exchanger 74 may also be secured in thermal exchange relationship with the reduction reactor 50 for use at a start-up of the fuel cell 12.

The heat generated within the fuel cell 12 during electrochemical oxidation of the molten metal anode 44 is transferred to the oxidant stream passing through the fuel cell 12. As the oxidant stream leaves the fuel cell 12 within the oxidant exhaust line 20, the heated oxidant stream may be directed through the oxidant exhaust line 20 into a reduction reactor heat exchanger 76. The reduction reactor heat exchanger 76 may be secured within the reduction reactor 50 as shown in FIG. 1, or may be secured adjacent or enveloping (not shown) the reduction reactor 50 to facilitate maintaining the liquid metal anode 44 in a molten state and/or provide heat (thermal energy) as needed for the reduction reactions. The heated oxidant stream may then leave the reduction reactor heat exchanger 76 and then pass through an extension 78 of the oxidant exhaust line 20 into a oxidant inlet heat exchanger 80 to increase the temperature of the oxidant stream 16 passing through the oxidant inlet 18 prior to entering the fuel cell 12. Upon exiting the Oxidant inlet heat exchanger 80 the oxidant exhaust passes out of the power plant 10 through an oxidant exhaust valve 82 and an oxidant vent 84. During operation of the fuel cell 12, electrons generated within the anode flow field move out of the fuel cell 12 through an electric circuit 86 to power an electric load 88 and back to the fuel cell 12 through the circuit 86.

The fuel cell power plant 10 may be configured so that the fuel cell 12 is secured in an inert atmosphere box 90. The box 90 is constructed to prevent intrusion into the box of molecular oxygen that could oxidize the liquid metal anode 44 instead of the desired oxidation of the molten metal anode by the oxygen ions passing through the electrolyte 36. The inert atmosphere box 90 may include any inert atmosphere that prohibits oxidation of the liquid anode 44, such as argon; nitrogen, etc. Alternatively, an inert gas feed line 92 may be secured in fluid communication between a reduction reactor product exhaust line 94 and the inert atmosphere box 90. During reduction of the liquid the reduction of the oxidized molten metal anode 44 by the reducing fuel 61, by-product gases including carbon dioxide, steam and minor concentrations of hydrogen and carbon monoxide leave the reduction reactor 50 through the reduction reactor product exhaust line 94, which may include a by-product exhaust valve 96. The inert gas line 92 may selectively direct a portion or all of the steam-carbon dioxide mixture from the reduction reactor exhaust line 94 into the inert atmosphere box 90 through an inert gas line valve 98 secured to the inert gas line 92.

The inert atmosphere box 90 includes the anode inlet 46 and anode outlet 48 so that droplets of the molten metal anode 44 and the molten metal anode 44 within the anode flow field 42 are never exposed to molecular oxygen from the atmosphere. Additionally, to prevent atmospheric molecular oxygen from entering the inert atmosphere box 90 the incoming oxidant stream 16, the oxidant inlet 18 includes a hermetically sealed inlet segment 100 between the inert atmosphere box and the cathode flow field 14. Additionally, a hermetically sealed outlet segment 102 is secured between the cathode flow field 14 and the inert atmosphere box 90 where the oxidant exhaust line 20 is secured to the inert atmosphere box 90, so that any unused molecular oxygen within the oxidant passing through the fuel cell 12 cannot contact the liquid molten metal anode simultaneously passing through the fuel cell 12. When the fuel cell 12 is secured within a fuel cell stack 120 (shown in FIG. 3), hermetically sealed inter-cell segments 103A, 103B (shown in FIG. 1) are secured between adjacent cells (shown as Cell A and Cell B in FIG. 3) to effectively contain the atmospheric air within oxidant inlet line 18, cathode flow field 14 and cathode exhaust outlets 118A, 118B and to define any air passageways or manifolds between adjacent cells 122, 124. The air distribution system as outlined hereinabove is established by joining inter-cell segments 103A, 103B by means of glass or glass ceramic materials which have sufficient dielectric strength to electrically isolate adjacent cells 122, 124 in a cell stack 12 while simultaneously achieving hermetic sealing of the air stream to avoid oxidation of the molten metal anode 44 by molecular oxygen.

As best shown in FIG. 2 the anode inlet 46' includes a first interrupted flow generator 104 secured in fluid communication with the anode inlet line 70'. The FIG. 2 schematic drawing shows an entry 106 of a anode flow field 42', and shows one form of the first interrupted flow generator 104 disposed above the entry 106 of the anode flow field 42'. This particular embodiment includes a pipe 108 that receives a flow of liquid molten metal anode from the anode inlet line 70'. The pipe 108 (which can also be in the form of a half pipe or trough (as shown in FIG. 2)) defines a plurality of drip holes 110 that are dimensioned to permit flow of the molten metal anode 44 through the holes 110 in the form of droplets 112, instead of a continuous or steady stream of liquid anode. Droplet formation from orifices 110 or capillary tubes 126 is dependent on the physical properties of the liquid as well as the flow rate of the liquid. The interrupted flow generators 104, 113 for the molten metal anode 44 solid oxide fuel cell 12 are configured to meet predetermined fuel cell 12 requirements. A density of molten antimony is about 6.7 g/ml; its surface tension is about 0.388 Newton/meter (N/m in SI units) at about 630.6° C. which is the melting point of antimony. Therefore, the orifice or drip holes 110 or inner tubing 126 diameter for the gravity-driven formation of molten antimony droplets for this solid oxide fuel cell 12 is anticipated to be in the range of 0.25 mm to 1.5 mm. It should be understood that other diameters as dictated by fuel cell performance requirements are within the scope of the teachings of this disclosure.

FIG. 2 also shows one embodiment of the anode outlet 48' wherein a second interrupted flow generator 113 is in the form of a plurality of outlet holes 114 defined at the anode outlet 48' of the anode flow field 42'. The outlet holes 114 are defined to include the same dimension limitations as the anode inlet holes 110 as described above. The droplets 112 leaving the holes fall by gravity into a droplet collector 115 which may also be in the form of a trough or funnel that directs the droplets as a stream into the anode exhaust line 52'. It is noted that the interrupted flow generator 104 and the droplet collector 115 are within the inert atmosphere box 90 so that molecular oxygen is excluded from contact with the liquid molten metal anode within inlet and outlet locations of cells 12, 120.

The interrupted flow generators 104, 113 disrupt electrical conductivity or continuity through the molten metal anode 44 within the anode flow field 42, 42' between the anode inlet 46, 46' and the anode outlet 48, 48' by interrupting a contiguous fluid stream passing from the anode inlet 46, 46' to the anode outlet 48, 48'. An exemplary interrupted flow generator causes the molten metal anode to flow into and out of the anode flow field in the form of droplets. It is to be understood that, while the first and second interrupted flow generators 104, 113 are described herein with respect to embodiments shown in FIGS. 2 and 3, the interrupted flow generators 104, 113 may take the form of any interrupted flow generator means known in the art for producing an interrupted flow of a liquid substance to disrupt electrical continuity between interrupted portions of the substance. While the interrupted flow generators 104, 113 based on gravity driven droplet formation is anticipated to be the simpler option, the interrupted flow generator 104, 113 also include interrupted flow generator means for interrupting flow of the molten metal anode 44 into and out of the anode flow field 14 such as molten metal fluid injectors (not shown) driven by interrupted applied pressure or force that meters or delivers a predetermined amount of liquid antimony or its mixtures with lead, bismuth, or tin into the anode flow field 42 would be another option, and any other apparatus capable of performing the described functions. Such alternative means for interrupting the flow of the molten metal anode 44 into and out of the anode flow field 44 may also include the type of injection systems similar to fuel injectors for internal combustion engines but unlike the latter the interrupted flow generators of the present application would not need to atomize the liquid.

Other drop-wise delivery system well known in the art would be part of the interrupted flow generator means of the present disclosure.

FIG. 2 also shows a simplified schematic relationship between the anode flow field 42' and a cathode flow field 14' without showing the cathode 26 or electrolyte 36. FIG. 2 shows oxidant inlet line 18' directing flow of a heated oxidant stream into oxidant entry receivers 116A, 116B, while oxidant exhaust line 20' receives a cathode exhaust from cathode exhaust outlets 118A, 118B, wherein the receivers 116A, 116B, and outlets 118A, 118B are on opposed sides of the cathode flow field 14', as an exemplary embodiment.

FIG. 3 shows an alternative first interrupted flow generator 104" appropriate for use with a stack 120 of solid oxide fuel cells secured adjacent each other so that the fuel cells may build voltage by connecting components of the cells electrically in series. FIG. 3 shows "CELL A" 122 secured adjacent "CELL B" 124. CELL B 124 has been described in detail above with respect to the components of the CELL B 124 and essentially the same components are shown in CELL A 122, but not described again for purposes of efficiency. The alternative first interrupted flow generator 104" includes single droplet tube 126 for each cell 122, 124 of the stack 120, wherein the droplet tube 126 is displaced above the entry 106" of the anode flow field 42" and is configured to permit a predetermined flow of inlet droplets 112" from the droplet tube 126 into the anode flow field 42". Such droplet tubes 126 may also include an adjacent flow regulator 128 configured to adjust a droplet 112" rate passing through the tube 126 into the anode flow field 42" entry 106" to a variety of predetermined rates depending upon varying requirements of the fuel cell 124. The droplet tube 126 and adjacent flow regulator are secured in fluid communication with the molten metal anode inlet line 70" which directs flow of the molten metal anode 44 into and through the droplet tube 126.

Additionally, the solid oxide fuel cell stack 120 of a plurality of cells 122, 124, may also include the second interrupted flow generators 113" of each cell 122, 124 in the stack, or of a group of cells within the stack, simply in the form of an anode flow field outlet hole 130 having dimensions similar to the dimensions described above with respect to the holes 110 of the FIG. 2 pipe or trough 108 displaced above the inlet 106 of the anode flow field 42'. While holes or orifices 130 are anticipated to be in the range of dimensions listed for the interrupted flow generators 104, 113, it must be appreciated that the actual dimensions and flow rate need to be dimensioned to ensure that the anode flow field 14 is essentially full of molten metal 44 and molten metal oxide mixtures 44 so that a maximum exposure of the molten metal anode 44 to the electrolyte 36 of the cell is effectively achieved. In this sense, proper sizing of the holes 110 or orifices 130 is very important. Of course, at steady state the volume of molten antimony 44 flowing into anode flow 14 field by the first interrupted flow generator 104 must match the volume of out-flowing mixture of molten metal and the molten oxide that forms by the electrochemical reaction passing through the second interrupted flow generator 113 so that the anode flow field 14 does not "dry out", i.e., is not deprived of liquid metal anode 44. The anode flow field holes 130 direct flow of droplets 112" leaving the cells 122, 124 into a shallow funnel-shaped collector 132. The shallow funnel-shaped collector 132 directs flow of the molten metal anode 44 leaving the fuel cell 124 and the inert atmosphere box 90 into an anode exhaust line 52" sealed against atmospheric molecular oxygen. The anode exhaust line 52" then leads the molten metal anode into to the reduction reactor 50 for reduction by the fuel 61 and recycling back into the fuel cell 124 as descried above.

FIG. 3 also shows a simplified, and fragmentary, schematic representation of an exemplary structure for a solid oxide fuel cell 124 having a molten metal anode 44 of the present invention. In particular, a firm, conductive, dimpled or "egg-carton" shaped cathode flow field support 134 defines an exterior wall of the cathode flow field 14', shown in FIG. 3 with respect to CELL B 124. A cathode flow field support 136 of an adjacent cell, CELL A 122 of FIG. 3, shows that the support 136 also serves to define an outer wall of an anode flow field 138 of the adjacent cell, CELL A 122. The cathode flow field supports 134, 136 also serve as current collectors for the electrons released in the anode flow fields 42" 138 during the oxidation of the molten metal anode 44. A low resistance, conductive material 139, such as a wire mesh, may be secured within the cathode flow field to support conduction of electrons to the current collector supports 134, 136. FIG. 3 is fragmentary in the sense that it does not show details on the distribution of a cooling air stream within each cathode flow field and between adjacent repeat units or groups of cells. The cooling air distribution system within the stack 120 passes through the hermetically sealed inter-cell segments 103A, 103B to be hermetically sealed and the sealant materials need to be dielectric in order to ensure that the stack 120 is not electrically shorted. For example, United States Patent Application Publication. No. US 2010/0248065(A1) entitled "Fuel Cell Repeater Unit" describes a hermetically sealed distribution system for the fuel gas stream, that can be adapted to make the air distribution system hermetically sealed in the present case; which published patent application is incorporated herein by reference thereto.

As described above, in a preferred embodiment, the molten metal anode 44 primarily includes the metal antimony. Applying molten antimony to the above structures shows three key reactions identified above as "Reaction 1", characterized as "oxygen reduction" that takes place at the cathode electrode 26; "Reaction 2", characterized "antimony oxidation" or "oxidation of the molten metal anode" that takes place within the molten metal anode 44; and, "Reaction 3", characterized as "reduction by carbon from the fuel 61 of the antimony oxide or oxide of the molten metal anode" that takes place in the reduction reactor 50. To facilitate the reduction by carbon within the reduction reactor 50, the reactor may include an agitator 140 shown schematically in FIG. 3.

It has been determined that for a solid oxide fuel cell 12 having a length across a shortest distance of a first planar surface 28 of the cathode electrode 26 of about ten centimeter ("10 cm"), a number of necessary holes 110 or tubes 126 would be about 2 or 3 holes 110 or tubes 126. Similarly, the number of molten metal droplets would be expected to be in the range of 1 to 5 droplets per minute depending on droplet diameter and the operating parameters of the fuel cell 12. It is to be understood that the numbers for holes or orifices and the frequency or rate of droplet delivery does not represent limitations to the specification, and are only a representation of an exemplary predetermined droplet size and drip rate.

Because the present solid oxide fuel cell power plant 10 depends on droplet 112 movement by the force of gravity, the fuel cell 12 or fuel cells 122, 124 within the plant 10 in some efficient embodiments would require that a vertical alignment axis 142 of the fuel cell that permits droplet or interrupted free fall flow of the molten metal anode be about parallel to an axis of the direction of the force of gravity 144, in order to prevent the droplets in free fall from forming an uninterrupted, electrically conductive stream (not shown). However, the fuel cell 12 would tolerate a change in the vertical alignment axis 142 of the fuel cell so that the vertical alignment axis 142 may vary by up to about twenty ("20°") degrees away from the force of gravity direction axis 144, depending upon an actual fuel cell 12, fuel cell stack 120 and power plant 10 design. The variability of the vertical alignment axis 142 applies to the fuel cell 12 having the molten metal anode droplets in free fall in response to the force of gravity. If the droplets have a non-zero velocity from pumping, or any other motion characteristic, the fuel cell 12 would tolerate different vertical alignments.

The solid oxide fuel cell power plant 10 is also configured for efficient shut down of the plant 10 by facilitating removal of the very hot, molten metal anode 44 as rapidly and as efficiently as possible, into the reduction reactor 50. As discussed above, this avoids extreme stresses upon cell components of thermal cycling as the molten metal anode 44 cools off. To achieve the efficient removal of the molten metal 44, the fuel cell is configured so that the electrolyte 36 planar surfaces 38, 40 and the cathode electrode 26 planar surfaces 28, 30 are about parallel to the direction of the force of gravity axis 144; the interrupted flow generators 104, 113, 126 are oriented so the droplets 112 leaving them move in a droplet motion direction 142 about parallel to the direction of the force of gravity; and, the reduction reactor 50, 50', 50" is located below any fuel cell 12, 122, 124 wherein "below" is to mean with respect to the direction of the force of gravity.

While the molten metal anode 44 may include any metals and mixtures thereof that are capable of serving as an anode in the solid oxide fuel cells 12, 122, 124 such as described above, a preferred molten metal includes antimony. Antimony may also be mixed with other metals such as lead, bismuth, tin. Preferably the molten metal anode includes metals having a low melting temperature, such as below about 750° C., and that are soluble into or miscible with antimony. The concentration of other low melting temperature metals, such as lead, bismuth, and tin, is limited to a maximum of 5 mole % if only one of the low melting temperature metals is added, and limited to a maximum of 10 mole % if more than one low melting temperature metal is added to the molten metal anode 44.

The fuel cell 12 electrolyte 36 may include a partially or fully stabilized zirconia, and yttria or a scandia-doped zirconia would be preferred components of the electrolyte. Alternative compositions for the electrolyte 36 would be gadolinia-doped ceria, strontium-doped lanthanum gallate (LSG) and (strontium-doped) lanthanum (magnesium-doped) gallate (LSGM). The cathode electrode 26 would preferably include mixtures of stabilized zirconia or doped ceria and strontium-doped lanthanum manganite (LSM) or (strontium-doped) lanthanum (cobalt-doped) ferrite (LSCF). The latter could be with or without additions of stabilized zirconia or doped ceria. The porous metal support 32 for the cathode may be manufactured of low cost stainless steel which may be fabricated through mass production metal forming and joining processes. Additionally, the cathode electrode 26 and electrolyte 36 may be a bi-layer of the cathode electrode 26 as a film secured to a self-supporting electrolyte sheet 36. In such a case, the cathode electrode 26, which is supported by the electrolyte 36 is then bonded to the porous metal support 32 with electron-conducting bonding materials known in the art. Suitable bonding materials are, for example, ternary manganese-cobalt oxides which can be fired to good bonding strengths at temperatures as low as 750° C. A self-supporting electrolyte 36 and cathode 26 bilayer (not shown) requires sealing by means of high temperature glass or glass-ceramic materials between the zirconia electrolyte and the metallic cathode flow field 14" at the periphery of the bilayer to ensure that molecular oxygen does not escape into the inert atmosphere box 90.

Alternatively, the cathode electrode film 26 and electrolyte 36 may be deposited as thin films onto the porous metal support 32, 32" by means physical vapor deposition techniques and similar processes well-known in the art. In this case, the cathode electrode 26 thin film is first deposited on the porous metal support 32, 32" and then the electrolyte thin film is deposited so as to completely overlap the cathode electrode 26 area.

This approach eliminates both the need for bonding materials and the need for sealing materials. The cathode and electrolyte thin films are depicted in the schematic drawings of FIG. 3. The thickness of the cathode electrode 26" may be about 10-20 micrometers ("μm" is pronounced micrometer and stands for one millionth of one meter). The thickness of the electrolyte film 36" may be in the range of 3 to 10 micrometers. As shown also in FIG. 3, the adjacent cells 122, 124 include non-conductive fluid edge seals 146 to contain the molten metal anode 44 within the anode flow field 42, prevent outflow of molten metal and molten metal oxide from the periphery of the anode flow field 42 and ensure that outflow of molten materials occurs only through the orifices 130. For example, the seals shown in FIG. 3 at reference numerals 146 may be glass, or glass-ceramic mixtures, or any other seal material known in the art and that is appropriate for sealing the anode flow field 42 between adjacent solid oxide fuel cells 122, 124.

For purposes herein, the word "about" is to mean plus or minus ten percent.

While the above disclosure has been presented with respect to the described and illustrated embodiments of a solid oxide fuel cell power plant with a molten metal anode, it is to be understood that the disclosure is not to be limited to those alternatives and described embodiments. Accordingly, reference should be made primarily to the following claims rather than the foregoing description to determine the scope of the disclosure.

What is claimed is:

1. A solid oxide fuel cell power plant for generating an electrical current, the power plant comprising a solid oxide fuel cell including:
   a. a cathode flow field for directing flow of an oxidant stream through the cathode flow field in fluid communication with a cathode electrode and an electrolyte;
   b. an anode inlet for directing flow of a molten metal anode through the anode inlet;
   c. an anode flow field for directing flow of the molten metal anode from the anode inlet through the anode flow field and adjacent the electrolyte;
   d. an anode outlet for directing flow of the molten metal anode out of the anode flow field and into an anode exhaust line; and,
   e. the anode inlet including a first interrupted flow generator, the anode outlet including a second interrupted flow generator so that the first and second interrupted flow generators interrupt flow of the Molten metal anode between the anode inlet and the anode outlet to prevent electrical continuity between the anode inlet and the anode outlet through the molten metal anode within the anode flow field.

2. The solid oxide fuel cell power plant of claim 1, further comprising:
   a. a reduction reactor secured in fluid communication with the molten metal anode flowing out of fuel cell within the anode exhaust line;
   b. a fuel inlet secured in fluid communication between a fuel source and the reduction reactor for directing a reducing fuel into the reduction reactor; and, c. a pump secured in fluid communication with a molten anode outlet of the reduction reactor for directing flow of the molten anode from the reduction reactor through an anode inlet line back into the anode inlet.

3. The solid oxide fuel cell power plant of claim 2, further comprising an inert atmosphere box encasing the solid oxide fuel cell so that an inert atmosphere within the box prevents oxidation of the molten metal anode and the inert atmosphere box being configured to prevent intrusion into the box of molecular oxygen.

4. The solid oxide fuel cell power plant of claim 3, wherein the inert atmosphere box includes an inert atmosphere comprising at least one of nitrogen, argon and mixtures thereof.

5. The solid oxide fuel cell power plant of claim 3, further comprising an inert gas feed line secured in fluid communication between a reduction reactor product exhaust line and the inert atmosphere box for directing flow of by-product gases including carbon dioxide, steam, and concentrations of less than ten percent hydrogen and carbon monoxide leaving the reduction reactor through the reduction reactor product exhaust line, the inert gas feed line being for selectively directing a portion or all of the by-product gases from the reduction reactor exhaust line into the inert atmosphere box.

6. The solid oxide fuel cell power plant of claim 2, further comprising an oxidant exhaust line secured in fluid communication between the cathode flow field and a reduction reactor heat exchanger for directing a heated oxidant stream from the cathode flow field to the reduction reactor heat exchanger, the reduction reactor heat exchanger being secured in thermal exchange relationship with the reduction reactor for transferring heat from the fuel cell to the reduction reactor.

7. The solid oxide fuel cell power plant of claim 4, further comprising an oxidant inlet for directing an oxidant stream into the cathode flow field, the oxidant inlet including a hermetically sealed inlet segment secured between the inert atmosphere box and the cathode flow field, and including a hermetically sealed outlet segment secured between the cathode flow field and the inert atmosphere box for sealing the oxidant stream from leaving the inlet segment, the cathode flow field, and the outlet segment.

8. The solid oxide fuel cell power plant of claim 1, wherein the first interrupted flow generator includes a pipe defining a plurality of drip holes displaced above an entry of the anode flow field for directing droplets to pass from the pipe in an interrupted flow into the anode flow field.

9. The solid oxide fuel cell power plant of claim 1, further comprising a plurality of solid oxide fuel cells forming a stack of solid oxide fuel cells wherein the first interrupted flow generator includes a single droplet tube displaced above an entry of an anode flow field of each solid oxide fuel cell, the single droplet tubes are configured to permit a predetermined flow of inlet droplets into the anode flow field, and wherein the flow of the oxidant stream passes through a hermetically sealed inlet segment into each of the plurality of cells, through a hermetically sealed outlet segment out of each of the plurality of cells, through hermetically sealed inter-cell segments between the plurality of cells, and wherein the hermetically sealed segments include dielectric materials to prevent electrical conductivity through the hermetically sealed segments.

10. The solid oxide fuel cell power plant of claim 9, wherein each of the single droplet tubes includes a flow regulator configured to adjust a flow rate of droplets passing through the tubes to a variety of predetermined flow rates.

11. A solid oxide fuel cell power plant for generating an electrical current, the power plant comprising:

a. at least one solid oxide fuel cell, including;

i. a cathode flow field configured to direct an oxidant stream from an oxidant inlet, through the cathode flow field and out of the cathode flow field through an oxidant exhaust line;

ii. a cathode electrode having opposed first and second planar surfaces wherein the first cathode electrode planar surface is secured to a porous cathode support secured adjacent the cathode flow field;

iii. an electrolyte having opposed first and second planar surfaces wherein a first electrolyte planar surface is secured adjacent the second cathode electrode planar surface;

iv. an anode flow field configured to direct flow of a molten anode through the anode flow field from an anode inlet to flow adjacent the second electrolyte planar surface so that the molten anode is oxidized by oxygen ions passing through the electrolyte from the cathode electrode, and the anode flow field also configured to direct flow of the molten anode out of the anode flow field through an anode outlet;

v. the anode inlet including a first interrupted flow generator, and the anode outlet including a second interrupted flow generator so that the first and second interrupted flow generators prevent electrical continuity between the anode inlet and the anode outlet through the molten anode within the anode flow field;

b. a reduction reactor secured in fluid communication with the interrupted flow of molten anode flowing out of the anode outlet;

c. a fuel inlet secured in fluid communication with the reduction reactor for directing a reducing fuel into the reduction reactor to reduce the oxidized molten anode; and, d. a pump secured in fluid communication with a molten anode outlet of the reduction reactor for directing flow of the molten anode from the reduction reactor back into the anode inlet.

12. The solid oxide fuel cell power plant of claim 11, further comprising an inert atmosphere box encasing the at least one solid oxide fuel cell so that an inert atmosphere within the box prevents oxidation of the molten metal anode, and the inert atmosphere box being configured to prevent intrusion into the box of molecular oxygen.

13. The solid oxide fuel cell power plant of claim 12, further comprising an inert gas feed line secured in fluid communication between a reduction reactor product exhaust line and the inert atmosphere box for directing flow of by-product gases including carbon dioxide, steam, and concentrations of less than ten percent hydrogen and carbon monoxide leaving the reduction reactor through the reduction reactor product exhaust line for selectively directing a portion or all of the by-product gases from the reduction reactor exhaust line into the inert atmosphere box.

14. The solid oxide fuel cell power plant of claim 10, wherein the first interrupted flow generator includes a pipe defining a plurality of drip holes displaced above an entry of the anode flow field for directing droplets to pass from the pipe in an interrupted flow into the anode flow field, and the second interrupted flow generator is in the form of a plurality of outlet holes defined at the anode outlet of the anode flow field.

15. The solid oxide fuel cell power plant of claim 11, further comprising a plurality of solid oxide fuel cells forming a stack of solid oxide fuel cells wherein the first interrupted flow generator includes a single droplet tube displaced above an entry of an anode flow field of each solid Oxide fuel cell, the single droplet tubes are configured to permit a predetermined flow of inlet droplets into the anode flow field, and wherein the flow of the oxidant stream passes through a hermetically sealed inlet segment into each of the plurality of cells, through a hermetically sealed outlet segment out of each of the plurality of cells, and through hermetically sealed inter-cell segments between the plurality of cells, and wherein the hermetically sealed segments include dielectric materials to prevent electrical conductivity through the hermetically sealed segments.

16. The solid oxide fuel cell power plant of claim 15, wherein each of the single droplet tubes includes a flow regulator configured to adjust a flow rate of droplets passing through the tubes to a variety of predetermined flow rates.

17. The solid oxide fuel cell power plant of claim 11, wherein a vertical alignment axis of the fuel cell that permits droplet, interrupted free fall flow of the molten metal anode is within about twenty degrees of an axis of the direction of the force of gravity.

18. The solid oxide fuel cell power plant of claim 11, wherein the reduction reactor is located below the solid oxide fuel cell, wherein "below" is with reference to a direction of the force of gravity, to facilitate gravity drainage of the molten metal anode out of the at least one solid oxide fuel cell.

19. The solid oxide fuel cell power plant of claim 11, wherein the molten metal anode includes antimony.

20. The solid oxide fuel cell, power plant of claim 11, wherein the molten metal anode includes antimony and metals selected from the group consisting of lead, bismuth, tin, and other metals having a melting temperature below about 750° C. and that are at least one of soluble into and miscible with antimony, and wherein a concentration of a metal from the group is no greater than about 5 mole % if only one of the metals from the group is added, and wherein a concentration of metals from the group is limited to no greater than about 10 mole % if more than one metal from the group is added to the molten metal anode.

21. A method of operating the solid oxide fuel cell power plant of claim 1, the method comprising:
 a. interrupting flow of a molten metal anode between an anode inlet and an anode flow field of the solid oxide fuel cell;
 b. interrupting flow of the molten metal anode between an anode outlet and an anode exhaust line to prevent electrical continuity between the anode inlet and the anode outlet through the molten anode within the anode flow field;
 c. directing flow of an oxidant stream through a cathode flow field in fluid communication with a cathode electrode adjacent an electrolyte so that molecular oxygen within the oxidant stream is reduced releasing oxygen ions to pass through the electrolyte to oxidize the molten metal anode passing through the anode flow field.

22. The method of operating the solid oxide fuel cell power plant of claim 21, further comprising:
 a. directing a reducing fuel into a reduction reactor while simultaneously flowing the oxidized molten metal anode from the anode exhaust line through the reduction reactor;
 b. pumping the reduced molten metal anode back into the anode inlet.

* * * * *